(12) United States Patent
Horibe et al.

(10) Patent No.: US 6,522,252 B2
(45) Date of Patent: *Feb. 18, 2003

(54) PRESSURE SENSOR AND DOOR OPENING/CLOSING MONITORING SYSTEM

(75) Inventors: Koji Horibe, Kyoto (JP); Syo Sasaki, Kyoto (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/674,127

(22) PCT Filed: May 13, 1999

(86) PCT No.: PCT/JP99/02484
§ 371 (c)(1),
(2), (4) Date: Oct. 27, 2000

(87) PCT Pub. No.: WO99/60359
PCT Pub. Date: Nov. 25, 1999

(65) Prior Publication Data
US 2002/0190865 A1 Dec. 19, 2002

(30) Foreign Application Priority Data
May 15, 1998 (JP) .......................................... 10-150753

(51) Int. Cl.[7] .............................................. G08B 13/20
(52) U.S. Cl. ..................... 340/544; 73/37; 200/83 A
(58) Field of Search .......................... 340/544, 545.1, 340/545.2, 506; 73/31.04, 37; 200/83 R, 83 A (56) References Cited

U.S. PATENT DOCUMENTS

| 3,441,695 A | 4/1969 | Stedfeld ................... 200/81 R |
| 3,703,828 A | 11/1972 | Bullard, Jr. et al. .......... 73/179 |
| 3,829,851 A | 8/1974 | Evans et al. ................. 340/544 |
| 4,853,690 A | 8/1989 | Mayer et al. ............... 340/544 |

FOREIGN PATENT DOCUMENTS

| DE | 3512310 | 10/1986 |
| GB | 2211008 | 6/1989 |
| JP | 62-44638 | 2/1987 |
| JP | 62-115333 | 5/1987 |
| JP | 62-237600 | 10/1987 |
| JP | 3039783 | 5/1997 |
| JP | 10208170 | 8/1998 |
| WO | 92/06456 | 4/1992 |

Primary Examiner—Thomas Mullen
(74) Attorney, Agent, or Firm—Foley & Lardner

(57) ABSTRACT

A pressure sensor 10 has a sensor chip 14 attached in a package 13 formed with a stem 11 and a cap 12 bonded at open surface sides thereof. On both sides of a diaphragm 14a of the sensor chip, pressures are applied via a measurement pressure introducing tube 11a formed in the stem and a reference pressure introducing tube 12a formed in the cap. Here, a filter 15 is arranged in the reference pressure introducing tube and response to pressure at the reference pressure side is made slow. When the sensor is arranged in a room with a door and a pressure in the room is applied via two introducing tubes, if there is an abrupt change caused by the opening/closing of the door, the pressure change is immediately introduced only at the side of measurement pressure introducing tube with fast response and the differential pressure corresponding to the pressure change is applied on the diaphragm. As the differential pressure is employed, it can be determined whether the door is opened or closed.

22 Claims, 12 Drawing Sheets

PRESSURE SENSOR AND DOOR OPENING/CLOSING MONITORING SYSTEM

TECHNICAL FIELD

The present invention relates to pressure sensors and door opening/closing monitoring systems, and more particularly to sensors suitable for detecting door opening/closing.

BACKGROUND ART

Various types of sensors for detecting opening/closing of doors are known including switch-type, optical-type and infrared type sensors. All of these sensors are subjected to a certain limitation; for example, they must be installed near a door to be detected, as they directly monitor a condition and a position of the door to be detected. In addition, as an installation of the sensor is readily noticeable by a third person, if it is employed in a security system for detecting an intruder, for example, a counter measure can be easily taken. Further, as only one door can be detected by one sensor, for the detection of opening/closing of a plurality of doors, a plurality of sensors corresponding to the number of the doors is required.

On the other hand, to solve the problem as described above, a sensor for detecting opening/closing of a door based on pressure change caused by the opening/closing of the door is disclosed in the publication of Japanese Utility Model Registration No. 3039782 entitled "Sensor for Automatic Security System", for example. In addition, Japanese Utility Model Registration No. 3039783 entitled "Automatic Security System" discloses a system employing the same.

Figure 1A:
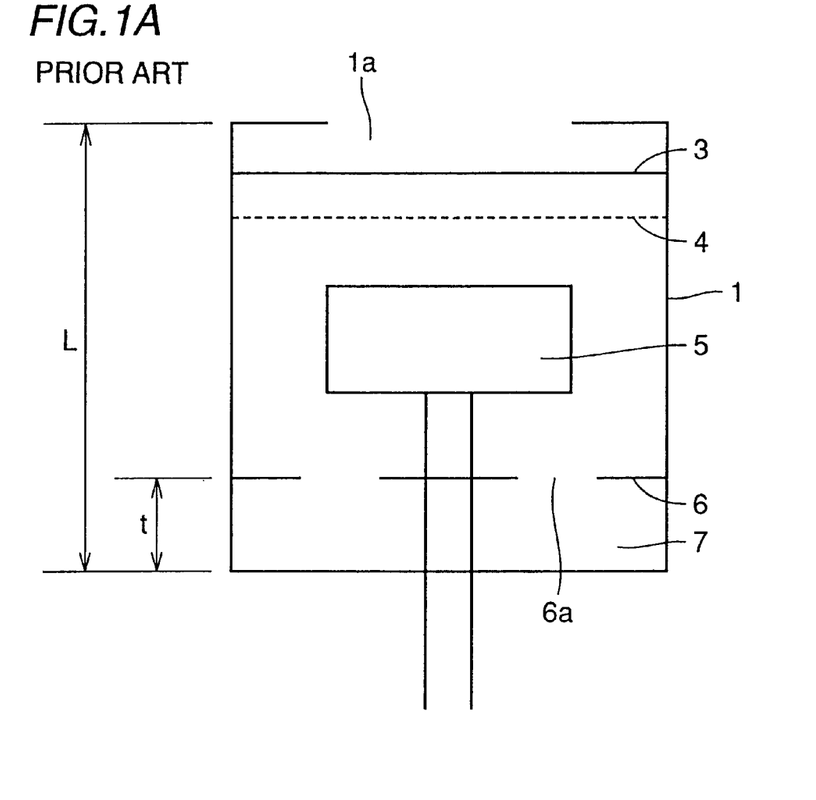
FIGS. 1A and 1B are diagrams showing a conventional door opening/closing detection sensor.
Figure 1B:
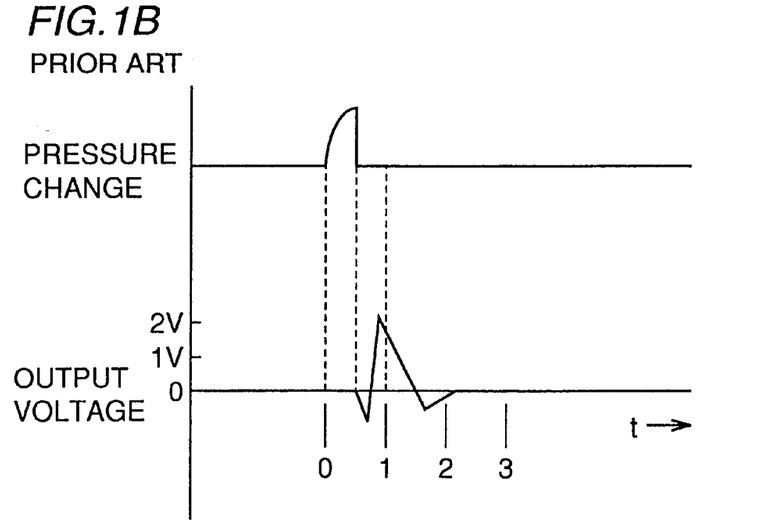

As shown in FIG. 1A, a sensor disclosed in these publications includes an opening 1a at one end of a cylindrical casing 1, a screen 3, an opposite electrode 4 and an amplifying circuit 5 arranged in this order from the side of opening 1a in casing 1 and acting as pressure receiving surfaces. Further, in a back side of casing 1, a partition wall 6 having a through hole 6a is arranged and a chamber 7 is formed between partition wall 6 and the back surface of casing 1, thus a differential-type fine differential pressure gauge is formed. The sensor senses with the pressure receiving surfaces a change in pressure in a space in which it is installed if there is a change and outputs a voltage as shown in FIG. 1B as a sensor output.

Thus, when, for example, the door is not opened nor closed and the pressure in the room is maintained at a constant level, the sensor output does not change (being maintained at a standard level), whereas when the door is opened or closed and the pressure in the room changes, the change in pressure in the room is reflected in a change in the sensor output, whereby the opening/closing of the door can be detected. In Japanese Utility Model Registration No. 3039783 "Automatic Security System", it is shown that the opening/closing of the door is monitored based mainly on an output from a differential-type fine differential pressure sensor, with one sensor as described above and one infrared sensor installed in the room.

The conventional sensor as described above (Japanese Utility Model Registration No. 3039782), however, is of a mechanical type and bulky. In addition, as an actual pressure change accompanying the opening/closing of the door is very small, a highly sensitive sensor is required. To increase the detectivity, a ratio of a depth L of casing 1 to a depth t of chamber 7 must be increased, which further increases the size and the shape of the sensor.

In addition, as the sensor is formed as a differential-type fine differential pressure gauge, the function is limited to the detection of the change in pressure and it cannot be known whether the change represents the opening or the closing of the door.

Further, according to the automatic security system, if there is a plurality of doors in the room, it is impossible to determine which door is opened. In addition, if the sensor itself has a trouble, the sensor output will be held at the standard level and determined to represent that there is no intruder. In other words, no function for detecting the failure of the sensor is provided. Thus various problems exist.

The present invention is made in view of the above described background and an object of the invention is to provide a pressure sensor and a door opening/closing monitoring system which will solve the problems as described above, is small and capable of detecting the opening/closing of the door with high sensitivity, allowing a detection of an operation condition, that is, whether the door is opened or closed, is subjected to less limitation in an installation position thereof and can be installed such that the sensor is not readily noticeable from outside, and allowing a determination on which door is opened/closed with a small number of sensors when a plurality of doors exists.

SUMMARY OF THE INVENTION

According to the present invention a pressure sensor is provided. The pressure sensor includes a pressure receiving side located in a gas; a reference pressure side located in the same gas as the pressure receiving side; a device for changing the speed of transmission of a change in pressure of the gas to said performance side. The pressure receiving side and the reference pressure side are subject to the same pressure during steady state conditions during which there is no gas flow.

In alternative embodiment of the present invention, a monitoring system for detecting the opening and closing of a door to a room is provided. The system includes a pressure sensor located in the room. The sensor includes a pressure receiving side located in a gas, a reference pressure side located in the same gas as the pressure receiving side, and a device for changing the pressure of the gas provided to the reference pressure side. The pressure sensor is configured to produce an output when the position of the door changes in response to a measured pressure difference between the reference pressure side and the pressure receiving side.

According to the present invention a monitoring system for determining which door among a plurality of doors in a room is opened or closed is provided. The system includes a plurality of pressure sensors positioned in the room; wherein each pressure sensor includes a pressure receiving side and a reference pressure side, both of the sides being exposed to the pressure in the room. Each pressure sensor includes a device for delaying the speed of transmission of a change in the pressure of the room to the reference pressure side. Each pressure sensor is configured to produce an output corresponding to a measured pressure difference between the pressure receiving side and the reference pressure side. The system further includes a means for determining which door opened or closed based on the difference between the production of outputs by each of said plurality of pressure sensors.

The present invention further includes a pressure sensing apparatus including a stem bonded to a cap to form a package. A sensor is positioned within the package. The sensor includes a reference pressure side and a received pressure side. The stem includes a first opening for supplying a gas to the received pressure side and the cap includes a second opening for supplying the gas to the reference pressure side. The apparatus further includes a device for changing the speed of transmission of a pressure change in the gas to the reference pressure side.

The present invention also includes a method of detecting the opening and closing of a door. The method may include the steps of positioning pressure sensors in a room containing the door, each of the sensors having a pressure receiving side and a reference pressure side, both of the sides being exposed to the pressure in the room; receiving a change in the pressure in the room associated with opening or closing the door on the pressure receiving side of each sensor; delaying the receipt of the pressure change on the reference pressure side of each sensor; measuring the pressure difference between the pressure receiving side and the reference pressure in each sensor; producing an output from each sensor corresponding to the measured pressure difference; and determining the position of the door based on the output.

A method of determining which door among a plurality of doors in a room is opened or closed is also provided. The method may include the steps of positioning a plurality of pressure sensors in the room, each of the sensors having a pressure receiving side and a reference pressure side, both of the sides being exposed to the pressure in the room; receiving a change in pressure in the room associated with opening or closing one of the plurality of doors on the pressure receiving side of each sensor; delaying the receipt of the pressure change on the reference pressure side of each sensor; measuring the pressure difference between the pressure receiving side and the reference pressure side of each sensor; producing an output from each sensor corresponding to the measured pressure difference; and determining which door among the plurality of doors was opened or closed based on comparing the output from each sensor.

To achieve the above described object, the pressure sensor according to the present invention is constructed as a pressure sensor detecting a pressure difference between a pressure receiving side and a reference pressure side in which a response to pressure is made different in the pressure receiving side and the reference pressure side. This pressure sensor is realized by a semiconductor pressure sensor including a diaphragm that is displaced according to a pressure, for example. Here, the pressure receiving side means a side to which a pressure to be measured is applied in a normal pressure sensor.

As the response to pressure is different from the pressure receiving side to the reference pressure side, if an abrupt pressure change at the opening/closing of the door is caused, for example, and the response (speed of response) is fast, the pressure change can be transmitted immediately to a pressure sensing unit of the pressure sensor, whereas if the response is slow, the pressure change will not be transmitted immediately. Hence, the transmission speeds of the abrupt pressure change at the pressure receiving side and the reference pressure side become different, and differential pressure is applied. Thus, the pressure change caused by the opening/closing of the door is represented as the differential pressure and detected by the pressure sensor.

On the other hand, when the pressure changes slowly as in the case of temperature change or atmospheric pressure change, the timings the change eventually reaches to the pressure sensing unit of the pressure sensor are same regardless of the difference in response and no differential pressure is produced. Thus, as the sensor output changes only in response to the abrupt change in pressure as in the case of opening/closing of the door, the opening/closing of the door can be readily detected.

In addition, by utilizing the difference in the speed of response to pressure, a small but highly sensitive sensor can be realized. In addition, the direction of pressure change is different in the case of door opening and in the case of door closing. In the present invention, as the differential pressure is detected, it can be determined whether the pressure increases or decreases. Thus, the opening/closing of the door, or more specifically, the operation condition of the door opening/closing can be known.

Further, as the change in pressure (differential pressure) is detected, the sensor is not necessarily installed near the door, which increase freedom in arrangement layout, and in addition, as the sensor does not directly monitor the operation of the door, it can be concealed behind a partition, a screen or the like. Further, the opening/closing of a plurality of doors can be detected by one sensor. If it is necessary to detect which one of the plurality of doors is opened/closed, a plurality of sensors must be provided.

Various means can be adopted as a device for changing the response to pressure. For example, the device can be a filter provided at least at the reference pressure side described above and acting as a resistance to a passage of a gas. The first embodiment realizes the device in this manner.

As another example of the device, a closed space-forming member (corresponding to a vessel 16 in the embodiment) provided at the side of the reference pressure can be employed. The closed space-forming member can be formed in a semiconductor forming a sensor or can be installed as an external attachment as in the embodiment. In addition, the closed space-forming member can be better realized when a minute hole is formed. The second embodiment realizes this. The formation of the closed space with the minute hole as described has an additional advantage, that is, clogging at the reference pressure side due to the dust and dirt can be suppressed as far as possible.

Here, by detecting the pressure in the room having a door at the pressure receiving side, and applying an equivalent pressure with the pressure in the room on the reference pressure side, a pressure variation accompanying the opening/closing of the door may be detected utilizing the difference in the response to pressure between the pressure receiving side and the reference pressure side. To apply the equivalent pressure to the pressure in the room on the reference pressure side, a pressure to the reference side can be introduced from outside the room, for example, if the pressure in the room is equal to the pressure outside the room. Of course, the pressure in the room may be applied to the reference pressure side as to the pressure receiving side. Here, "equivalent" is a concept covering "same".

In the door opening/closing monitoring system according to the present invention, a plurality of pressure sensors provided with a device differing the response to pressure of the pressure receiving side and the reference pressure of the pressure receiving side and the reference pressure side for detecting the pressure difference between the pressure receiving side and the reference pressure side is prepared, and the plurality of pressure sensors is installed in a room with a plurality of doors to be monitored, and the system further includes a determination device (corresponding to an integrated determination unit 30 in the embodiment) determining which door is opened/closed based on a difference in sensor outputs from the plurality of pressure sensors.

Thus, with the use of the plurality of sensors, it can be determined which door is opened or closed. In other words, as the distance from the position of installation of each sensor to the door is different from each other, the time lag is produced between the arrivals of the transmitted pressure change caused by the opening/closing of the door to the installation positions of the sensors. Hence, by determining which sensor first detects the pressure change among the plurality of sensors, the door opened/closed can be identified. In addition, as the distance to a source of pressure change, that is, the opened/closed door can be known based on the time lag in detections at sensors, even if there are three doors as in the embodiment or more than three doors, it can be determined which door is opened/closed by installing at least two sensors.

DETAILED DESCRIPTION

The embodiments of the present invention will be described below with reference to the drawings.

Figure 2:
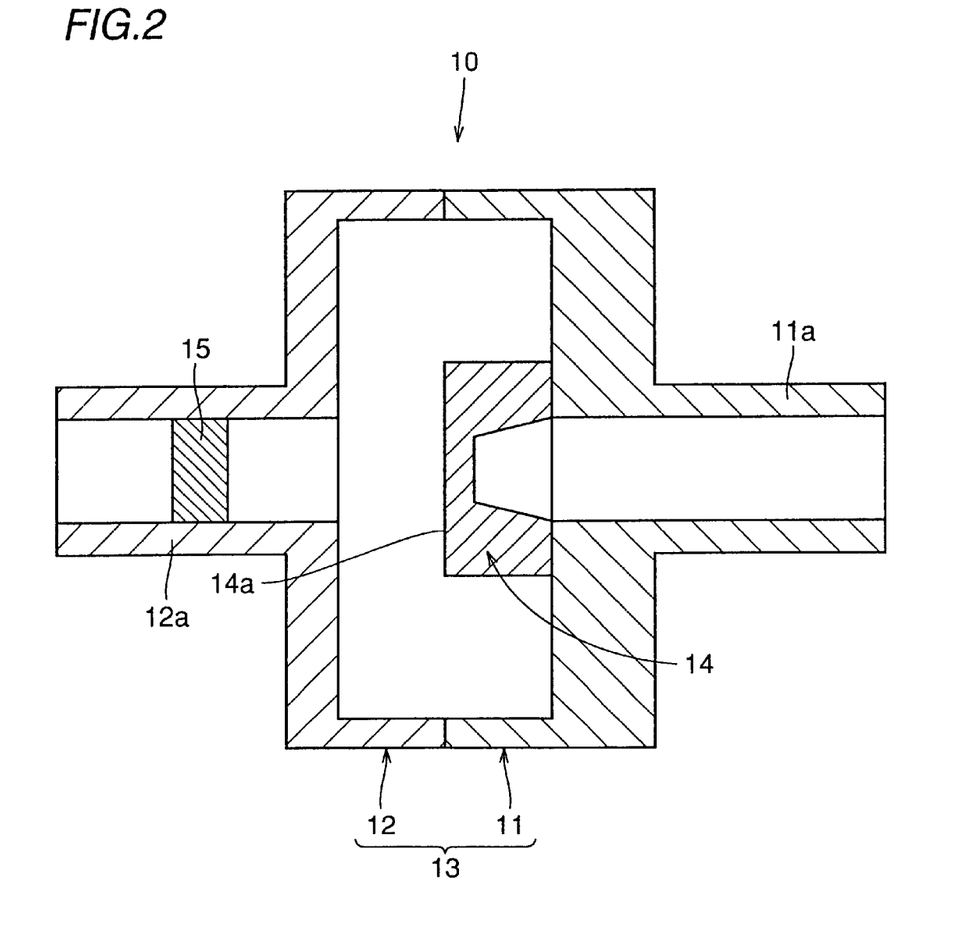
FIG. 2 is a diagram showing a pressure sensor according to the first embodiment of the present invention.

With reference to FIG. 2, a pressure sensor 10 according to the first embodiment of the present invention has a structure in which a sensor chip 14 is arranged in a package 13 formed by bonding a stem 11 and a cap 12 at open surface sides of each other as a basic structure. More specifically, sensor chip 14 is formed from a semiconductor sensor having a diaphragm 14a flexing at a pressure. In this example, elements such as a piezoelectric element is attached to a periphery of diaphragm 14a and an amount of displacement of diaphragm 14a hence a pressure to be measured is detected based on a resistance value of the piezoelectric element deformed in conformity with the displacement of diaphragm 14a. Of course, various types of sensors other than the type described above can be aid employed, for example, an electrical capacitance sensor can be formed by further placing a fixed substrate such as a glass substrate. Then, sensor chip 14 as described above is attached to a bottom surface of stem 11.

To stem 11, a through hole is formed in a center of the bottom surface and a received pressure (measurement pressure) introducing tube 11a connected to the through hole is formed in a center of an outer bottom surface. Thus, a pressure introduced via measurement pressure introducing tube 11a hits diaphragm 14a.

In addition, in a center of a top surface of cap 12, a through hole is formed and a reference pressure introducing tube 12a connected to the through hole is formed in a center of an outer top surface. Thus, the reference pressure introduced via reference pressure introducing tube 12a hits an opposite surface of diaphragm 14a.

As a result, the measurement pressure (received pressure) and the reference pressure are applied to respective surfaces of diaphragm 14a and diaphragm 14a is displaced according to the amount of difference between these pressures. Thus, the pressure sensor according to the present invention is basically formed as a differential pressure gauge comparing the measurement pressure and the reference pressure and supplying an output corresponding to the difference thereof.

Here, in the present embodiment, the response/speed of response to the pressure change is different at the measurement pressure side and the reference pressure side. Specifically, a filter 15 is provided in reference pressure introducing tube 12a for this purpose. Filter 15 can be formed of a porous material, or formed as an orifice.

With such a structure, a pressure of an air in the room is changed at a passage through filter 15 and the resulting pressure is transmitted to sensor chip 14. As an abrupt change in pressure is not transmitted and only a mild change is transmitted through filter 15, when the pressure in the room suddenly changes due to the opening/closing of the door, a signal is output as a sensor output corresponding to the difference in the speed of response to the pressure change at two sides (measurement pressure side and the reference pressure side) of diaphragm 14a of sensor chip 14. On the other hand, if there is a mild pressure change such as a temperature change or an atmospheric pressure change, the change is transmitted regardless of the existence of filter 15 and the pressures on two sides of diaphragm 14a are balanced. In other words, no change will occur in the sensor output and the effect of such environmental change can be suppressed as far as possible.

Figure 3A:
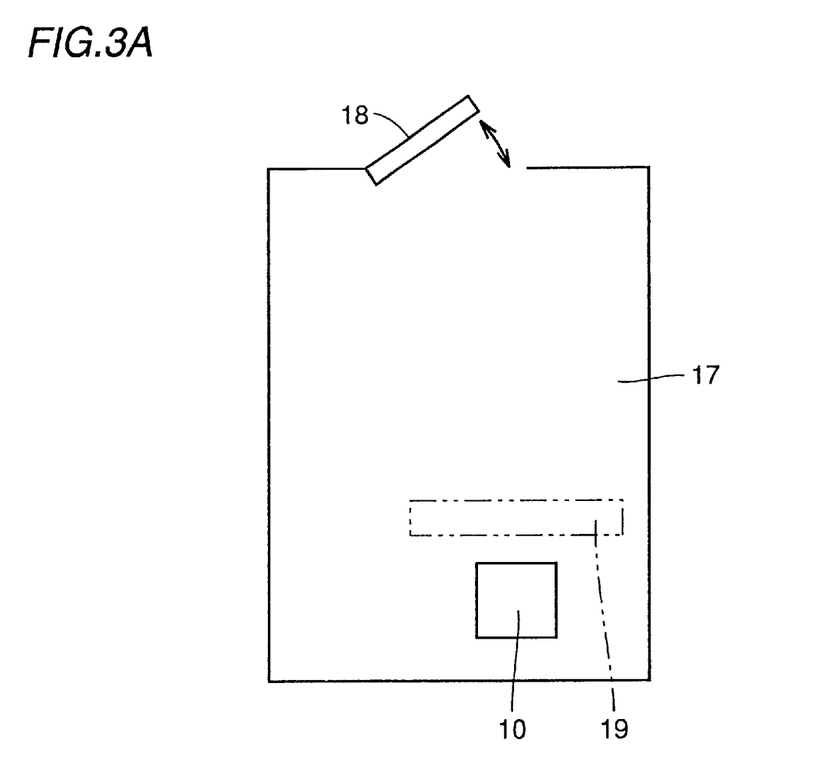
FIGS. 3A and 3B show an example of use of a pressure sensor according to the first embodiment.

Next, a specific example of use will be described. As shown in FIG. 3A, pressure sensor 10 is installed at a predetermined position of a room 17 to be monitored. The position of installation is not necessarily close to a door 18 and the sensor can be arranged away from the door as shown in the drawing. In addition, this position is not necessarily directly opposite to door 18 and can be a position on a back surface of a partition wall 19. With such structure, as it becomes difficult for an intruder from outside, for example, to know the existence of pressure sensor, mischievous acts on pressure sensor 10 are prevented and more secure detection is allowed. Here, the measurement pressure introducing tube and the reference pressure introducing tube of pressure sensor 10 are both arranged such that the air in room 17 is introduced.

With such structure, the opening/closing of door 18 can be detected according to the measurement principle described below. When door 18 is of a type which swings toward outside room 17 and is opened as shown, if door 18 is an open state as shown is closed, air around door 18 flows into the room and the air pressure in room 17 increases for a while. Conversely, if door 18 in a closed state is opened, air around door 18 is exhausted out of room 17 together with the swing of door 18. Thus the air pressure in room 17 lowers. Of course, if there is now air pressure difference between inside and outside room 17, exhausted air comes back into the room afterwards and the air pressure will be balanced after a temporal air pressure rise.

Figure 3B:
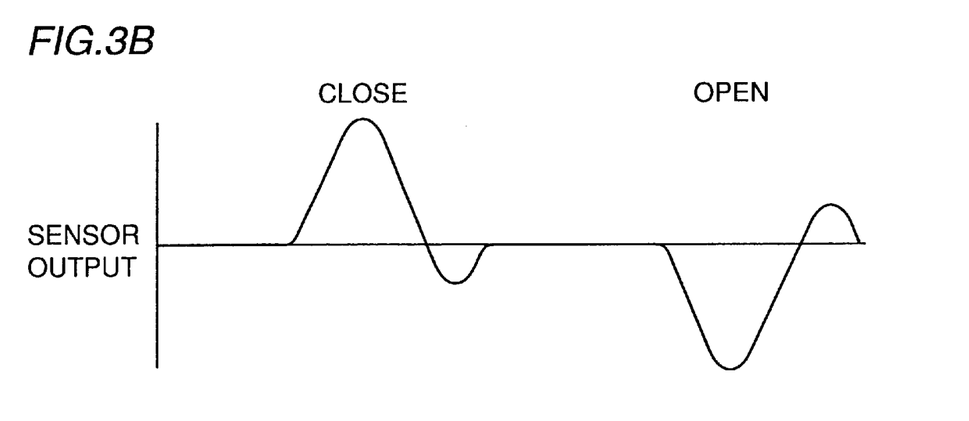

Thus by the opening/closing of door 18, the pressure in room 17 changes and the directions of changes (increase/decrease) in pressure are different in the case of opening and in the case of closing. Hence, in the sensor output, a waveform corresponding to the opening/closing of the door appears as shown in FIG. 3B and protrudes in opposite directions in "opening" and "closing". Thus, the opening/closing can be detected and even which operation occurs can be identified based on the sensor output.

Figure 4:
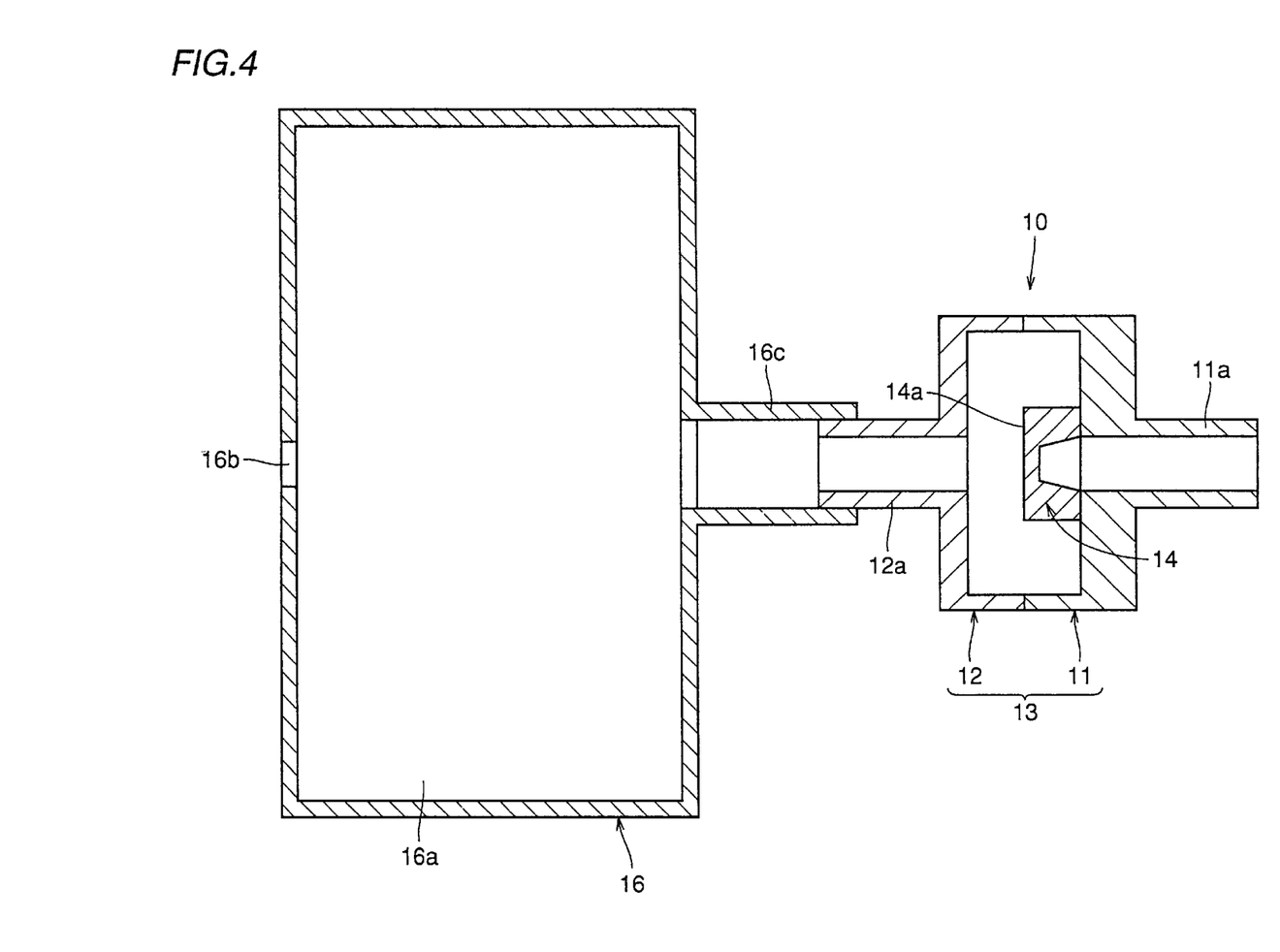
FIG. 4 is a diagram showing a pressure sensor according to the second embodiment of the present invention.

In FIG. 4, a pressure sensor of the present invention according to the second embodiment is shown. As the basic structure of the sensor is the same with the first embodiment shown in FIG. 2, the same reference characters are employed and the detailed description will not be repeated.

In this embodiment, as a structure for differing response to the pressure change at the measurement pressure side and the reference pressure side, a buffer space (closed space) is provided instead of filter 15. Thus, a vessel 16 is attached to reference pressure introducing tube 12a. Vessel 16 has a main body 16a enclosing a space with a relatively large internal volume and, a minute hole 16b formed on a side surface of main body 16a and vessel 16 is connected to reference pressure introducing tube 12a via a connection tube 16c formed on an opposite side to minute hole 16b.

Thus, diaphragm 14a of sensor chip 14 is open to the atmosphere via minute hole 16b, main body 16a, connection tube 16c and reference pressure introducing tube 12a. As the space in main body 16a has a very large volume compared with minute hole 16b, minute hole 16b and the space in main body 16a serve as an electrical resistance and a condenser. Thus, an abrupt change in pressure caused by the opening/closing of the door is directly transmitted to sensor chip 14 via measurement pressure introducing tube 11a at the measurement pressure side. On the other hand, at the reference pressure side, the pressure change is transmitted through minute hole 16b and via main body 16a (space) and reference pressure introducing tube 12a to sensor chip 14. Therefore, the difference is generated between the time required for the pressure to spread to the space via minute hole 16b and reach the reference pressure side and the time the abrupt pressure change caused by the opening/closing of the door to reach the measurement pressure side and, the pressure change is not immediately transmitted to the reference side of diaphragm 14a. Hence, because of the difference in speed of response, the pressure before the door opening/closing or the pressure nearly equal thereto is still applied on the reference side of diaphragm 14a and differential pressure with the pressure after change caused by the opening/closing of the door is applied on diaphragm 14a of sensor chip 14. Thus, the opening/closing of the door can be detected according to the same principle as in the first embodiment.

Figure 5:
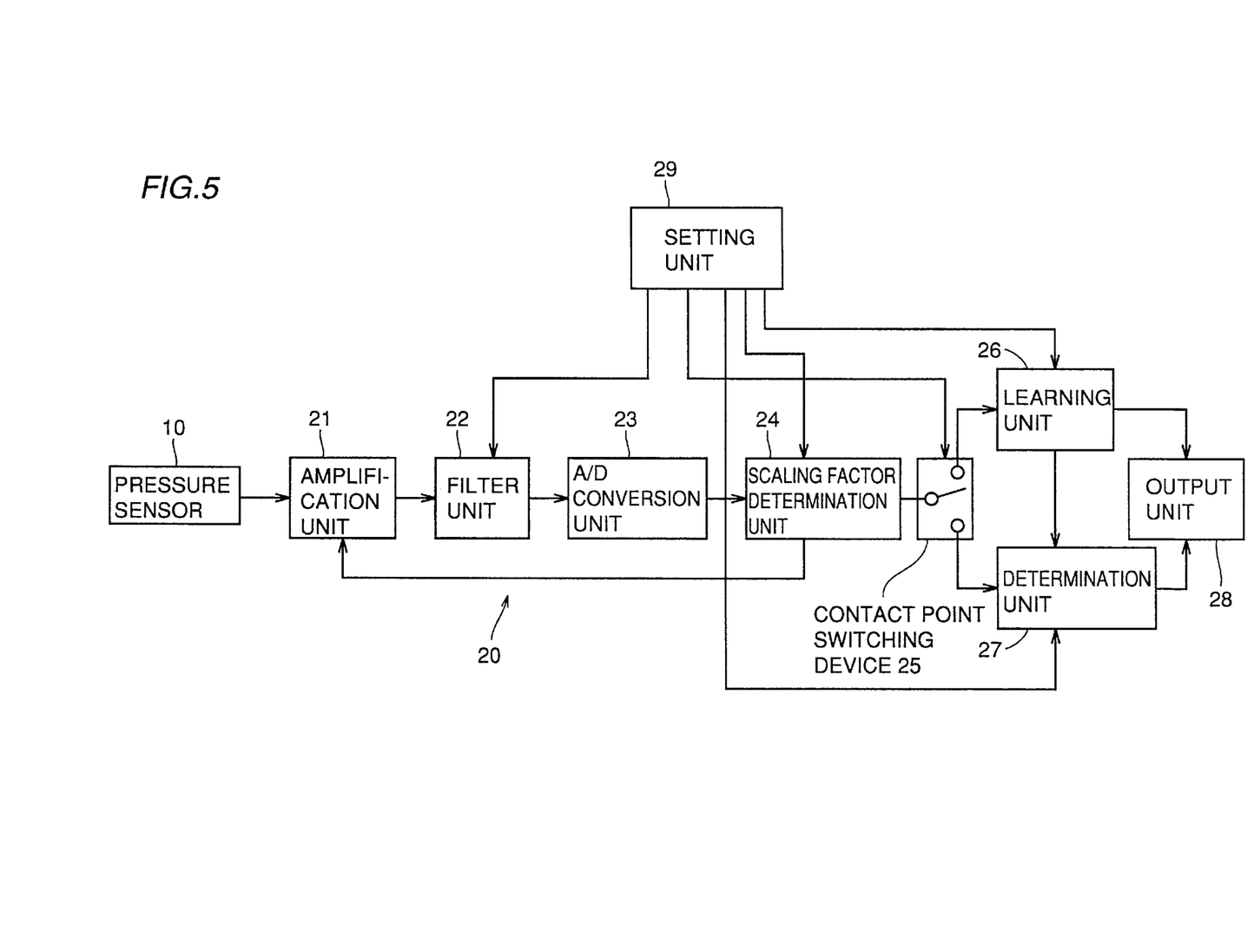
FIG. 5 is a diagram showing a signal processing circuit.

Next, a signal processing circuit for detecting the actual opening/closing of the door employing the pressure sensor described above will be described. As shown in FIG. 5, a signal processing circuit 20 receives an output from pressure sensor 10 and performs a predetermined signal processing. In the present embodiment, signal processing circuit 20 operates in a monitor mode for detecting an actual opening/closing and a learning mode for generating a determination standard (knowledge) at the monitoring in the monitor mode.

First, the output from pressure sensor 10 is amplified by an amplification unit 21 and an unnecessary frequency component is removed at a filter unit 22 and a left part is converted to a digital signal at an A/D conversion unit 23. Then, the digital signal generated by conversion is sent to a contact point switching device 25 via a scaling factor determination unit 24, and then selectively sent to a learning unit 26 or a determination unit 27. The result of processing at learning unit 26 or determination unit 27 is sent to an output unit 28 and output in a predetermined manner. A switching instruction/setting instruction for each processing unit is made based on a control signal from a setting unit 29. A specific structure of each processing unit described above is as follows.

Amplification unit 21 amplifies a signal level of the sensor output to a level at which the processing is possible and the amplification factor thereof is determined at scaling factor determination unit 24 and set based on a control signal sent from scaling factor determination unit 24. Specifically, a ratio of a resistance which determines a scaling factor of an amplifier in amplification unit 21 is selected and set to a value such that a signal generated by amplification by amplification unit 21 falls in an input range (or an output range) of A/D conversion unit 23. When a peak value of a waveform is higher than the input range, the value is set such that the amplification factor is decreased and when the peak value is lower than the input range or extremely low, the value is set such that the amplification factor is increased.

Filter unit 22, removing an unnecessary frequency component for determination from the amplified signal, includes a high pass filter removing a low frequency component and a low pass filter removing a high frequency component connected in series. A cut frequency is set at a level as to allow the removal of direct current portion of the signal in the case of the high pass filter and set to a characteristic frequency band (1 kHz, for example) of the pressure sensor or to a frequency of a high frequency component noise irrelevant to the signal in the case of the low pass filter. The setting of the cut frequency is performed at setting unit 29.

A/D conversion unit 23, converting an analog signal passing through filter unit 22 to a digital signal, replaces a signal in the range from 0 to 5 V to an integer value in the range from 0 to 255 (in the case of 8 bits).

Figure 6:
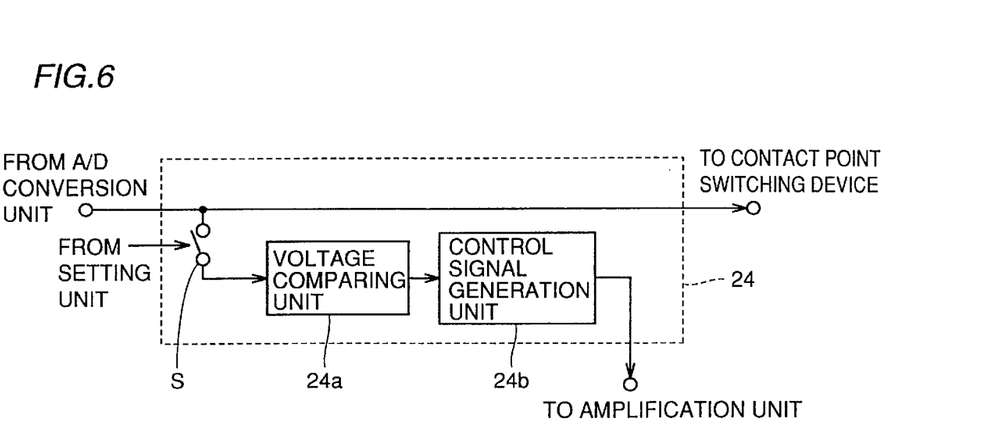
FIG. 6 is a diagram showing a structure of a scaling factor determination unit.

An internal structure of scaling factor determination unit 24 is as shown in FIG. 6. To a line transmitting a signal in a through state from A/D conversion unit 23 to contact point switching device 25, a branch path is connected via a switch S and a voltage comparing unit 24a and a control signal generation unit 24b are connected in series in the branch path. Switch S opens/closes based on the control signal from setting unit 29 and closes the contact point during the learning mode.

Voltage comparing unit 24a determines whether the received digital signal is higher than the output range of A/D conversion unit 23 and, if it is higher, sends an instruction to control signal generation unit 24b to lower a numerical value of the control signal by one stage from the current value. When the received digital signal is lower than the predetermined value, an instruction will be sent to raise the numerical value by one stage from the current control signal.

The determination is performed based on the waveform of the sensor output at the time of opening/closing of the door obtained by actually opening/closing the door in the state of learning mode. Thus, the control is performed to confine the peak of the waveform into a predetermined range. Hence, it is more preferable if a hold function, for example, is added, because then the peak of the waveform can be easily known and the appropriateness of the value can be determined.

Then, control signal generation unit 24b sends a control signal relating to the amplification factor to amplifying unit 21.

Figure 7:
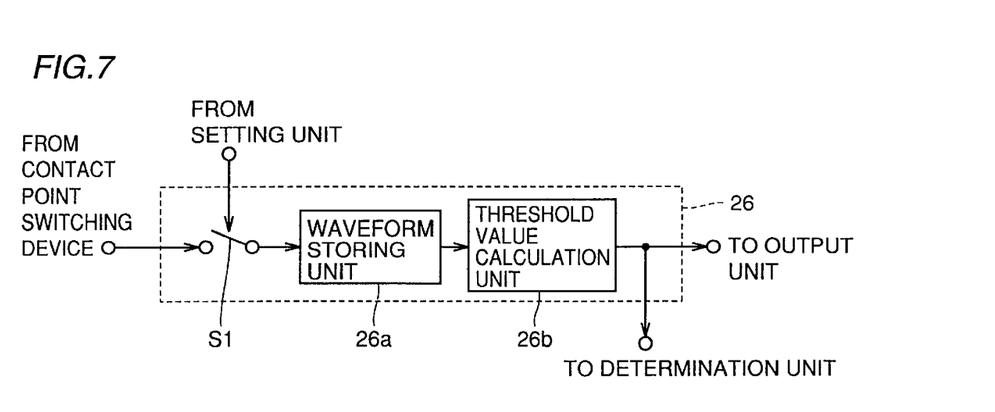
FIG. 7 is a diagram showing a structure of a learning unit.

Learning unit 26 is formed by a trigger switch S1, a waveform storing unit 26a, and a threshold value calculation unit 26b connected in series as shown in FIG. 7. Trigger switch S1 closes the switch in response to a trigger signal from setting unit 29. In other words, if the trigger signal is generated from setting unit 29 simultaneously with the door opening/closing while learning unit 26 side is connected via contact point switching device 25 (in the state learning mode is selected), an output signal (digital signal) from A/D conversion unit 23 is taken into waveform storing unit 26a. The taking-in of the digital signal continues for a certain period or up to a certain storage amount.

Then in threshold calculation unit 26b, a threshold value necessary for the determination is calculated from the stored digital signal. Various calculation algorithms can be employed for the calculation of the threshold value, and one operation example for calculation is as follows. By finding an average value Va and a peak value Vp of the waveform data stored in waveform storing unit 26a, and substituting them into the following expression, a threshold value Vh can be found.

$$Vh=(Vp-Va)\times 0.5+Va$$

Then, an output (threshold value) from threshold value calculation unit 26b is sent to output unit 28 and to determination unit 27 in the next stage. As the signs of the sensor outputs are opposite from each other in the case of door opening and the door closing, learning is performed and the threshold value is found for each. Here, which operation is to be performed is indicated through a switch (provided in an operation unit 29, for example) not shown. In addition, the signs of sensor outputs are opposite in the case of door opening toward outside the room and door opening toward inside the room. As which operation is to be performed is indicated in advance as described above, it is possible to determine which type the door is based on the waveform of the sensor output, hence, the threshold value and the determination algorithm (whether the value is determined to be higher than the threshold value when it is higher than the threshold value or the value is determined to be higher than the threshold value when it is lower than the threshold value) can be automatically determined. Of course, a switch to set the type of the door can be provided.

Figure 8:
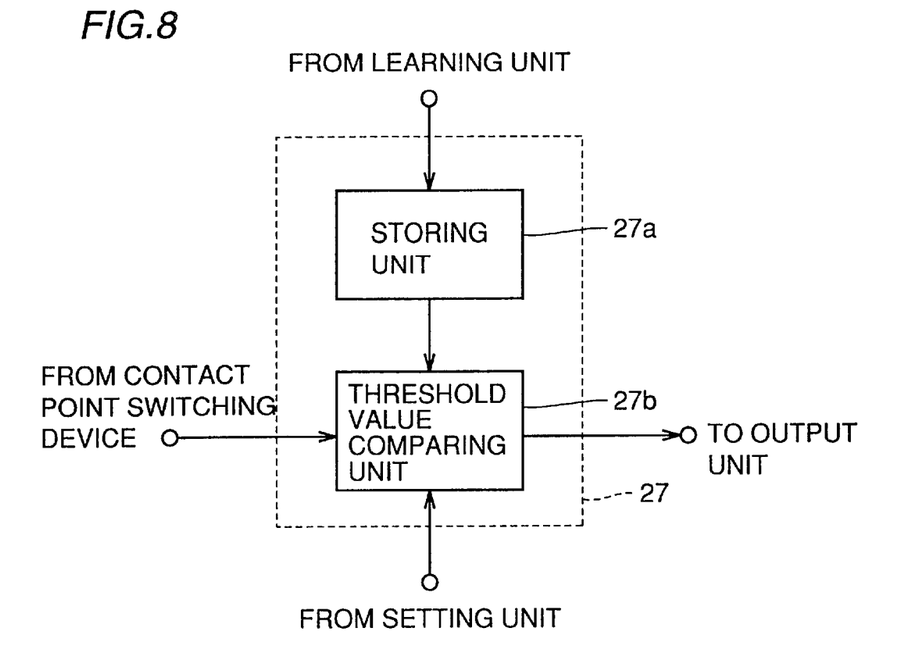
FIG. 8 is a diagram showing a structure of a determination unit.

As shown in FIG. 8, determination unit 27 includes a storing unit 27a and a threshold value comparing unit 27b. In storing unit 27a, a threshold value sent from learning unit 26 is stored. Threshold value comparing unit 27b compares a value based on the sensor output and the threshold value and outputs the result. In other words, when determination unit side is selected at contact point switching device 25 (determination mode is selected), first, the threshold value is read out from storing unit 27a and the digital signal from A/D conversion device 23 is sent to threshold comparing unit 27b, and these values are compared. When the digital signal exceeds the threshold value, an abnormal signal is output and when the digital signal does not exceed the threshold value, a normal signal is supplied. This determination result is sent to an output unit 28. This is the operation in a normal crime prevention mode.

In the present embodiment, a non-crime prevention mode (set by setting unit 29) is provided and, when the non-crime prevention mode is selected, an abnormal signal is supplied when the digital signal does not exceed the threshold value for a certain period and otherwise a normal signal is supplied.

The crime prevention mode is employed when entrance of any person to the room is prohibited. Hence, if there is an abrupt change in pressure as in the door opening/closing, it is determined to be abnormal as it is very likely that someone enters the room. Thus, the monitoring of the intruder can be performed. On the other hand, the non-crime prevention mode is employed when people come in and out of the room incessantly. In this case, the pressure change caused by the door opening/closing is natural and the detection of door opening/closing does not regarded as abnormal. In the non-crime prevention mode, as the door opening/closing, hence, the change in the sensor output is normal, if no pressure change is detected for a certain period, it can be assumed that the pressure sensor becomes defective or some failure has occurred. For example, the pressure sensor may be covered with a cap. Thus, the abnormal signal is output when the threshold value is not exceeded for a certain period. Thus the self-diagnosis can be performed.

Figure 9:
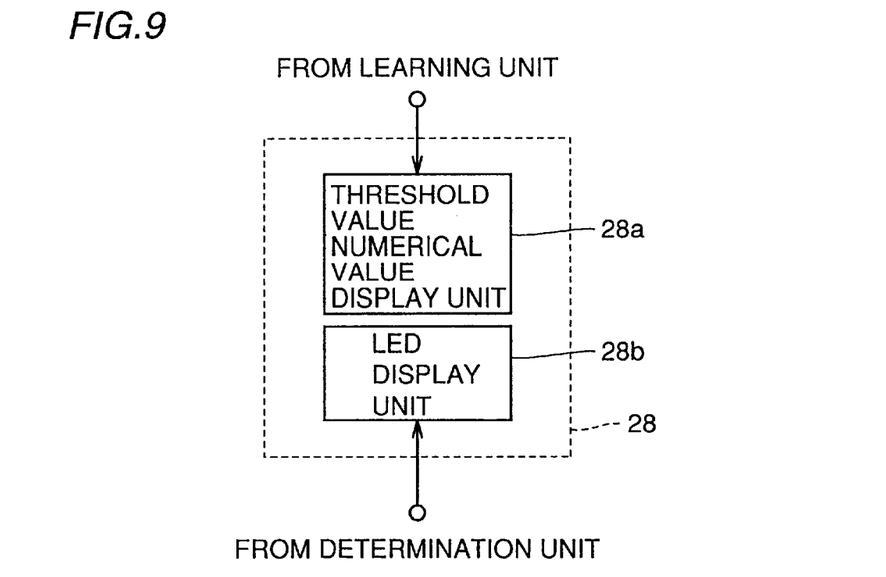
FIG. 9 is a diagram showing a structure of an output unit.

Output unit 28 includes a threshold value numerical value display unit 28a and an LED display unit 28b as shown in FIG. 9. Threshold value numerical value display unit 28a displays the threshold value generated by calculation at learning unit 26 as a numerical value, and the value can be displayed as the numerical value itself displayed by a liquid crystal or by an arrangement of many LEDs lighted by a number corresponding to the numerical value of the threshold value. LED display unit 28b lights a green LED when the normal signal is sent from determination unit 27 and lights a red LED when the abnormal signal is sent.

Figure 10:
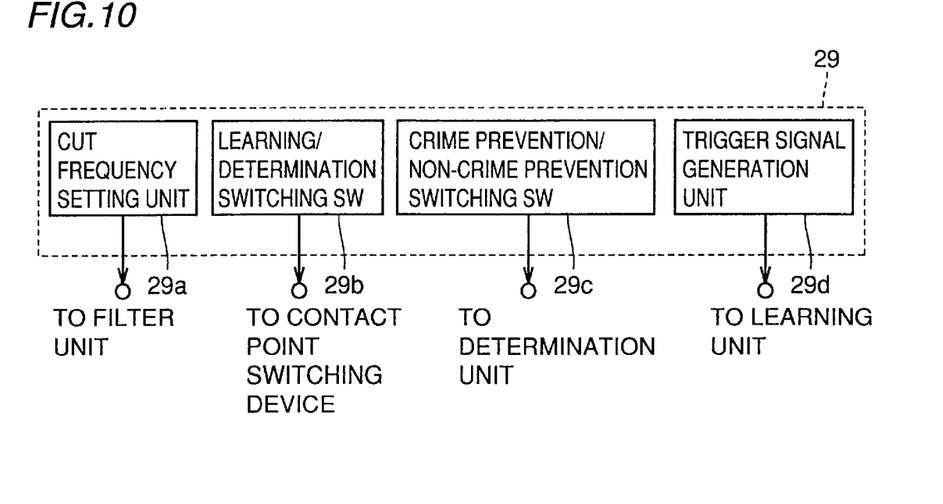
FIG. 10 is a diagram showing a structure of a setting unit.

As shown in FIG. 10, setting unit 29 includes a cut frequency setting unit 29a, a learning/determination switching SW 29b, a crime prevention/non-crime prevention switching SW 29c, a trigger signal generation unit 29d and so on. Cut frequency setting unit 29a sets the cut frequency of filter unit 22 and the cut frequency is input as a numerical value. The numerical value can be input through a keyboard, a dial or the like, for example.

Learning/determination switching SW 29b is a switch setting the contact point of contact point switching device 25 to learning or determination. In the learning mode, device 25 is connected to learning unit 26 and in determination mode connected to determination unit 27.

Crime prevention/non-crime prevention switching SW 29c is connected to determination unit 27 and the determination algorithm is selected. In other words, in the crime prevention, it is determined as abnormal if the threshold value is exceeded and in the non-crime prevention, it is determined as abnormal if the threshold value is not exceeded for a certain period.

Trigger signal generation unit 29d is connected to learning unit 26 and generates a trigger signal for starting the learning. The trigger signal can be generated by a button or by the transmission of a pulse signal from an external source. In response to the trigger signal, switch S of learning unit 26 is closed for a certain period.

Figure 11:
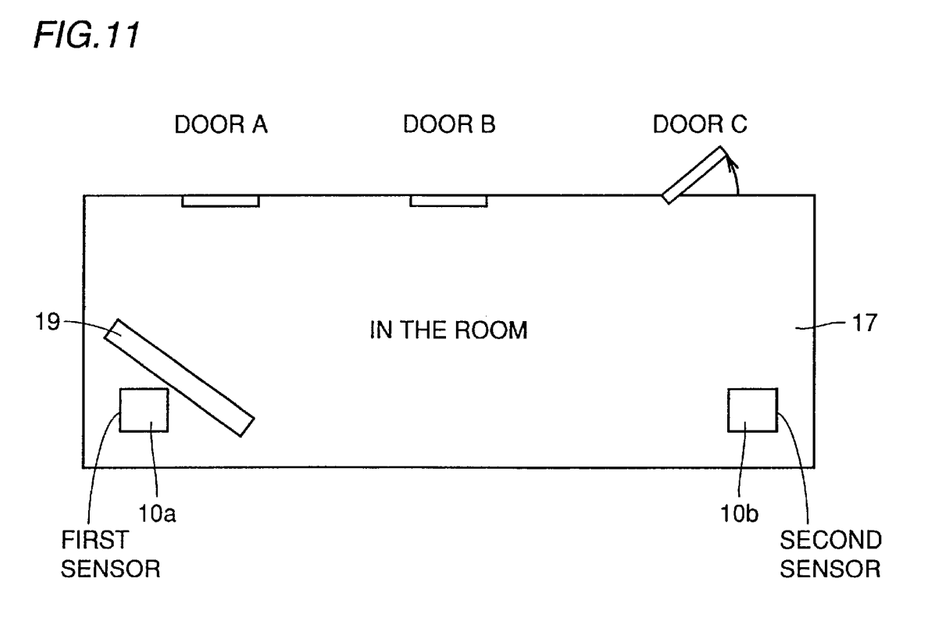
FIG. 11 is a diagram showing an example of installation condition of a door opening/closing monitoring system according to the present invention.

FIG. 11 shows an example of a system monitoring a door opening/closing employing the pressure sensor described above. The system of the present invention can be used with one pressure sensor as described with reference to FIG. 3 or with a plurality of pressure sensors (in this example, two) as shown in FIG. 11. With the installation of the plurality of sensors, it can be determined which door among a plurality of doors is opened/closed.

As shown, three doors (A, B and C) are provided to room 17 and a first sensor 10a and a second sensor 10b are arranged at optional positions in the room. As sensors 10a and 10b are placed apart from each other by a predetermined distance, the distances from door A or door C to sensors 10a and 10b are different. The distances from door B are same. In addition, door A, B and C are all of a swing-type and the doors swing toward outside room 17 and open.

Though in the example shown in the drawing, first sensor 10a side alone is arranged such that it is concealed behind a back surface of partition wall 17, this is for describing that the detectivity is not affected by the existence of partition wall 19 and the sensor can be arranged in an exposed state in room 17 as second sensor 10b. Hence at an actual installation, both sensor may be arranged as to be concealed behind the partition wall or the like or may be arranged in an exposed state.

Figure 12A:
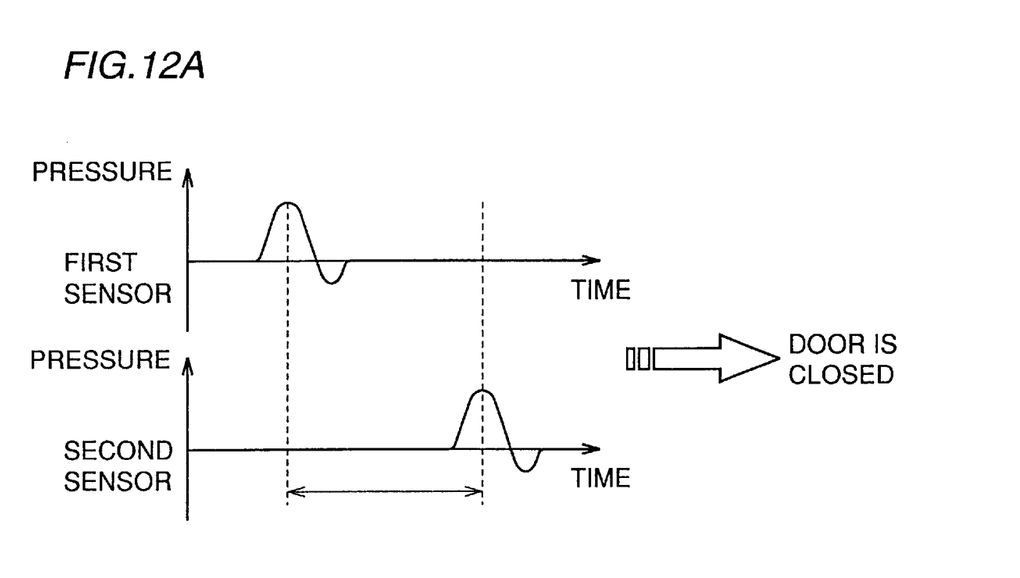
FIGS. 12A, 12B, 13, 14 and 15 are referenced for describing an operation principle of a door opening/closing monitoring system.
Figure 12B:
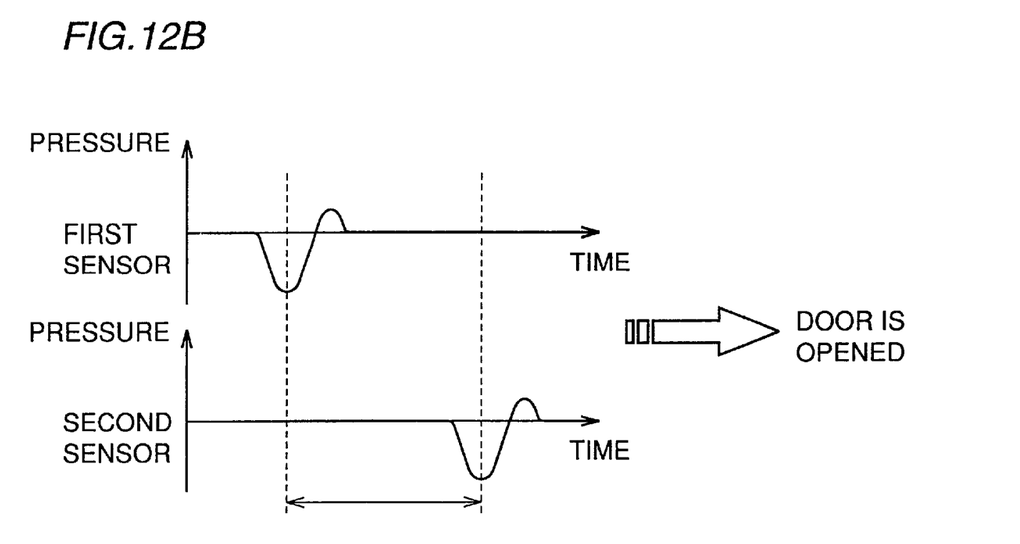

With the installation as described above, when one of the doors is opened, the sensor output is lowered as the air pressure in the room decreases and, when a door is closed, the sensor output rises as the air pressure in the room increases. In other words, as shown in FIG. 12A, if the sensor output indicates pressure increase, the door is determined to be closed and as shown in FIG. 12B if the sensor output indicates the pressure decrease, the door is determined to be opened. In this case, as both sensors produce the same result, it can be known that the detection is not faulty and the accuracy of the determination result improves as to whether the opening/closing of the door happens or not and as to which operation has been performed.

As the time required for transmission of the pressure change differs dependent on the distance from the door to the sensor, the change in sensor output caused by the opening/closing of the door appears faster in a sensor closer to the door. Hence, as shown in FIGS. 12A and 12B, the time lag is caused in the timings of waveform generation accompanying the opening/closing of the door.

Figure 13:
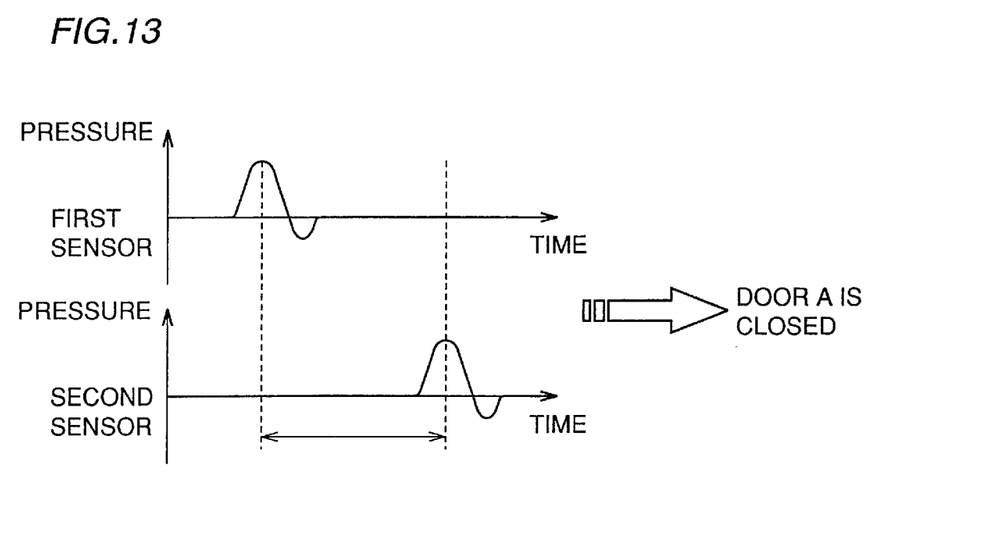

Thus; which door is opened can be known through detecting which sensor first detects the pressure variation caused by the opening/closing of the door. When first sensor 10a first detects the change as shown in FIG. 13, it can be determined that door A located at the side of first sensor 10a is opened/closed, and in addition, as the pressure increases, it can be determined that door A is closed.

Figure 14:
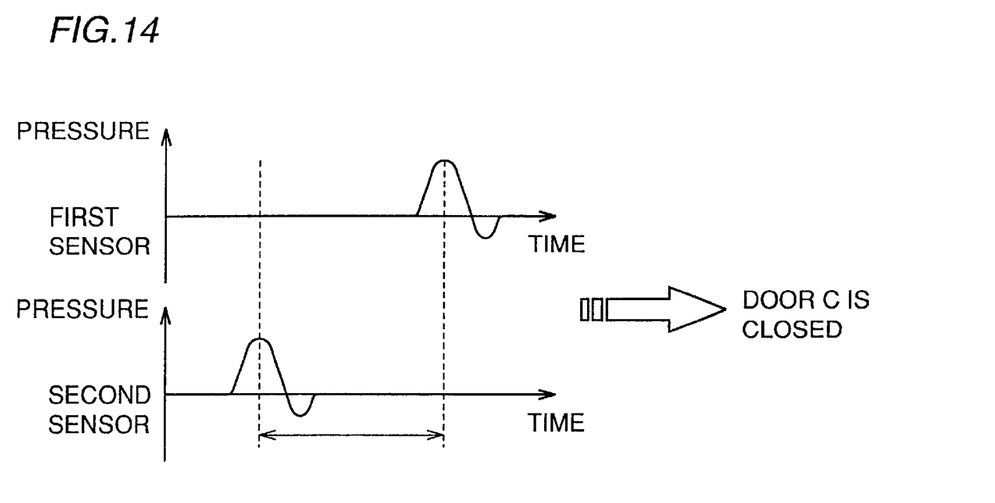
Figure 15:
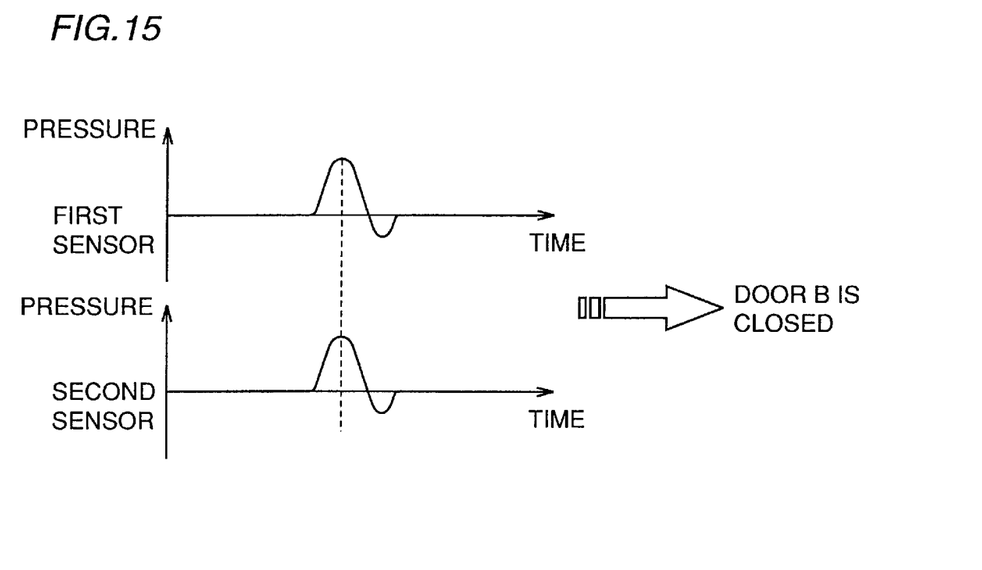

Similarly, as shown in FIG. 14, when second sensor 10b first detects the change, it can be determined that door C is closed. In addition, when both sensors 10a and 10b detect the change almost simultaneously, as shown in FIG. 15, it can be determined that door B is closed. Of course, if each waveform shows downwards protrusion, it can be determined that a corresponding door is opened.

Figure 16:
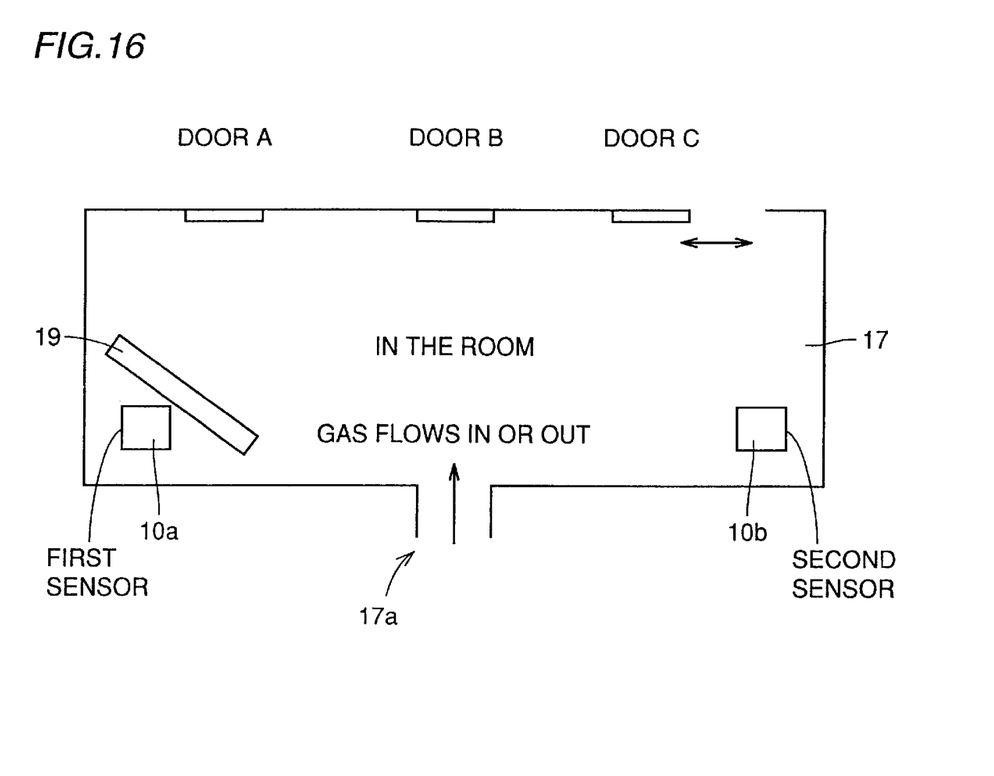
FIG. 16 is a diagram showing another example of an installation condition of a door opening/closing monitoring system according to the present invention.

If doors A, B and C are slide-type doors as shown in FIG. 16, the flow of the air accompanying the movement of the door is little and the pressure change is little. However, there is an opening 17a in a part of room 17 as shown and air flows in an out of the room therethrough, the pressure change is caused between the door-open state and the door-closed state, and therefore the opening/closing of the door can be detected according to the principle as described above. When a gas flows in through opening 17a, opening of the door causes the escape of air and decrease of the pressure, whereas closing of the door recovers the former state and increases the pressure. If the air flows out through opening 17a, a reverse phenomenon is observed.

Figure 17:
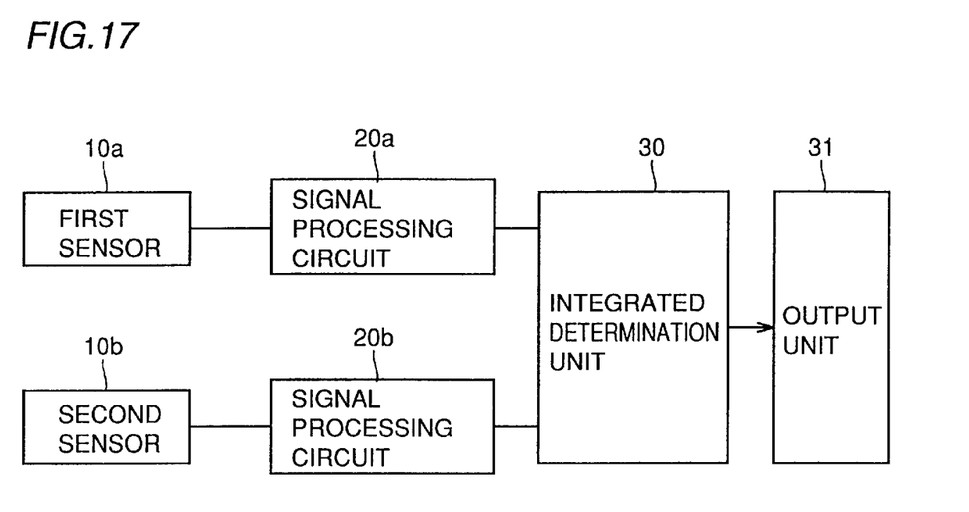
FIG. 17 is a block diagram of a door opening/closing monitoring system according to the present invention.

A system for detecting the opening/closing of the door as described above can be realized by a structure as shown in a block diagram of FIG. 17; for example. Outputs of sensors 10a and 10b installed in predetermined positions in the room are connected to signal processing circuits 20a and 20b, respectively. The signal processing circuit employed herein can be of Almost same structure with signal processing circuit 20 shown in FIG. 5. The difference is that the signal processing circuit in FIG. 17 has a function of externally supplying the output from determination unit 27 (result of determination). The output of determination unit 27 in each signal processing circuits 20a and 20b is supplied to integrated determination unit 30. Integrated determination unit 30 determines from which sensor a detection signal arrives first (or if signals from sensors arrive at the same time) and determines which door opens/closes and determines which operation of the door (open/close) is performed based on the direction of the waveform, by using a built-in timer or a combination of logical circuits as required. The determination result is sent to output unit 31 and a predetermined alarm output is supplied. As an output from output unit 31, various types of outputs can be employed including an audio output and an optical output.

Industrial Applicability

As described above, as the pressure sensor according to the present invention detects the differential pressure of the reference pressure side and the pressure receiving side by differing the response to pressure of the reference pressure side and the pressure receiving side, the sensor can be made small, and capable of detecting the opening/closing of the door with a high sensitivity, in addition the sensor allows the determination of operation condition of whether the door is opened or closed, and in addition, the limitation in installation position is little and the sensor can be installed such that it is hardly noticeable from outside.

What is claimed is:

1. A pressure sensor comprising:
   a pressure receiving side located in a gas;
   a reference pressure side located in the same gas as the pressure receiving side;
   a device for changing the time required for a change in pressure of the gas to be sensed by said reference pressure side; and
   wherein the pressure receiving side and the reference pressure side are subject to the same pressure during steady state conditions during which there is no gas flow; and,
   wherein the pressure receiving side communicates with the same gas through a first opening and the reference pressure side communicates with the same gas exclusively through a second opening different than the first opening.

2. The pressure sensor according to claim 1, wherein said device is a filter positioned on said reference pressure side and providing resistance to passage of a gas.

3. The pressure sensor according to claim 2, wherein
   a pressure in a room having a door is detected by said pressure receiving side and a steady state pressure in said room is applied to said reference pressure side; and wherein
   a pressure variation caused by opening or closing of said door is detected by a pressure difference between said pressure receiving side and said reference pressure side.

4. The pressure sensor according to claim 1, wherein said device is a closed space-forming member located adjacent said reference pressure side and wherein the device includes a minute hole that restricts the flow of gas.

5. The pressure sensor according to claim 4, wherein
   a pressure in a room having a door is detected by said pressure receiving side and a steady state pressure in said room is applied to said reference pressure side; and wherein a pressure variation caused by opening or closing of said door is detected by a pressure difference between said pressure receiving side and said reference pressure side.

6. The pressure sensor according to claim 1, wherein a pressure in a room having a door is detected by said pressure receiving side and a steady state pressure in said room is applied to said reference pressure side; and wherein a pressure variation caused by opening or closing of said door is detected by a pressure difference between said pressure receiving side and said reference pressure side.

7. A monitoring system for detecting the opening and closing of a door to a room comprising:

a pressure sensor located in the room and including:

a pressure receiving side located in a gas, a reference pressure side located in the same gas as the pressure receiving side, and a device for changing the pressure of the gas provided to the reference pressure side;

wherein the pressure sensor is configured to produce an output when the position of the door changes in response to a measured pressure difference between the reference pressure side and the pressure receiving side;

wherein the pressure receiving side communicates with the same gas through a first opening and the reference pressure side communicates with the same gas exclusively through a second opening different than the first opening.

8. The system of claim 7, further comprising a signal processing circuit for receiving the output produced by the sensor and determining whether the door opened or closed.

9. The system of claim 8, wherein the signal processing circuit comprises a learning unit for determining a threshold value of the output associated with the opening of the door.

10. A monitoring system for determining which door among a plurality of doors in a room is opened or closed comprising:

a plurality of pressure sensors positioned in the room; wherein each pressure sensor includes a pressure receiving side and a reference pressure side, both of the sides being exposed to the pressure in the room;

wherein each pressure sensor includes a device for delaying the time required for a change in the pressure of the room to be sensed by the reference pressure side;

wherein each pressure sensor is configured to produce an output corresponding to a measured pressure difference between the pressure receiving side and the reference pressure side;

a means for determining which one of the plurality of doors opened or closed based on the difference between the production of outputs by each of said plurality of pressure sensors.

11. The system of claim 10, wherein the means for determining includes an integration determination unit.

12. A pressure sensing apparatus comprising:

a stem bonded to a cap to form a package;

a sensor positioned within the package and having a reference pressure side and a received pressure side;

wherein the stem includes a first opening for supplying a gas to the received pressure side and the cap includes a second opening for supplying the gas to the reference pressure side; and a device for changing the time required for a pressure change in the gas to be sensed by the reference pressure side.

13. The apparatus of claim 12, wherein the device is positioned in the second opening.

14. The apparatus of claim 12, wherein the device comprises a filter.

15. The apparatus of claim 12, wherein the cap includes a tube surrounding the second opening.

16. The apparatus of claim 15, wherein the device is positioned with the tube.

17. The apparatus of claim 12, wherein the sensor is connected to the stem and positioned so that the received pressure side faces the first opening.

18. The apparatus of claim 12, wherein the sensor includes a diaphragm.

19. The apparatus of claim 18, wherein the sensor includes a piezoelectric element.

20. A method of detecting the opening and closing of a door comprising the steps of:

positioning a pressure sensor in a room containing the door, the sensor having a pressure receiving side and a reference pressure side, both of the sides being exposed to the pressure in the room;

receiving a change in the pressure in the room associated with opening or closing the door on the pressure receiving side;

delaying the receipt of the pressure change on the reference pressure side;

measuring the pressure difference between the pressure receiving side and the reference pressure in the sensor;

producing an output from the sensor corresponding to the measured pressure difference; and determining the position of the door based on the output.

21. A method of determining which door among a plurality of doors in a room is opened or closed comprising the steps of:

positioning a plurality of pressure sensors in the room, each of the sensors having a pressure receiving side and a reference pressure side, both of the sides being exposed to the pressure in the room;

receiving a change in pressure in the room associated with opening or closing one of the plurality of doors on the pressure receiving side of each sensor;

delaying the receipt of the pressure change on the reference pressure side of each sensor;

measuring the pressure difference between the pressure receiving side and the reference pressure side of each sensor;

producing an output from each sensor corresponding to the measured pressure difference; and determining which door among the plurality of doors was opened or closed based on comparing the output from each sensor.

22. The method of claim 21, wherein the step of determining includes comparing the time at which each sensor produced an output corresponding to the measured pressure difference.

* * * * *